United States Patent [19]
Thompson

[11] 3,719,739
[45]* March 6, 1973

[54] METHOD OF PREPARING A CATALYST
[75] Inventor: Charles E. Thompson, Warren, N.J.
[73] Assignee: Esso Research and Engineering Company
[ * ] Notice: The portion of the term of this patent subsequent to Jan. 25, 1989, has been disclaimed.
[22] Filed: Jan. 29, 1970
[21] Appl. No.: 6,973

[52] U.S. Cl. ................................423/213, 252/472
[51] Int. Cl. .............................................B01d 53/34
[58] Field of Search ..................23/2 E, 2 S; 252/472

[56] References Cited

UNITED STATES PATENTS

| 3,438,721 | 4/1969 | Innes | 23/2 E |
| 3,370,914 | 2/1968 | Gross et al. | 23/2 E |
| 3,467,492 | 9/1969 | Newman | 23/2 |
| 1,907,710 | 5/1933 | Bass | 252/472 |

FOREIGN PATENTS OR APPLICATIONS

| 738,479 | 12/1932 | France | 23/162 |
| 470,894 | 8/1937 | Great Britain | 23/2 |

Primary Examiner—G. O. Peters
Attorney—Pearlman and Stahl and Louis F. Kreek, Jr.

[57] ABSTRACT

Catalysts comprising ruthenium and iridium on a conductive support give excellent results in removing nitrogen oxides from exhaust gases from internal combustion which contain less than 2 percent oxygen. Ruthenium and iridium can be present as metals, oxides, or mixtures thereof; iridium constitutes about 10 to 60 percent of combined amount of ruthenium and iridium. Metal supports, especially ferrous metal such as stainless steel or chromium steel, are preferred. Conventional shapes, e.g., fabricated sheet metal or screens, can be used.

6 Claims, No Drawings

METHOD OF PREPARING A CATALYST

BACKGROUND OF THE INVENTION

This invention relates to catalysts for removing noxious impurities from combustion gas streams, and particularly to supported catalysts for removing harmful components from the exhaust gases of internal combustion engines.

Waste products from various sources are discharged into the atmosphere and unless the waste products are treated to remove deleterious components, the waste products may contaminate the atmosphere. A specific example is the case of exhaust products from automotive engines. Such waste products contain one or more harmful components such as unburned hydrocarbons, carbon monoxide, nitrogen oxides, sulfur compounds, partially oxidized products, etc., in various concentrations.

Among the above constituents of exhaust gas, carbon monoxide, unburned hydrocarbons, and nitrogen oxides (e.g., NO) are considered undesirable from an air pollution standpoint. The toxic properties of carbon monoxide are well-known. Nitric oxide is also physiologically harmful. Hydrocarbons and NO are additionally harmful, even though present in very small amounts, because they participate in a sequence of photochemical reactions which result in the formation of eye-irritating, crop-damaging, visibility-reducing smog. These problems become acute in urban areas where local meteorological conditions prevent the normal upward convective movement of ground level air for long time periods. The recent and foreseeable future increase in automotive population density in urban areas, with the attendant increase in exhaust emissions, makes essential the discovery of effective solutions to these problems through reduction in the amounts of CO, hydrocarbons, and NO discharged from an automotive exhaust.

The usual, and widely studied and evaluated, approaches to these problems are based upon the fact that most engine operation is under rich-mixture conditions, i.e., there is usually too little oxygen present for the conversion of all hydrocarbons to carbon dioxide and water. Thus, one approach adjusts the carburetor toward leaner operation and also makes certain other adjustments of the engine. This approach can reduce CO and hydrocarbons, but probably will increase NO and can result in engine performance that is inferior to that obtained with a richer mixture.

Another approach adds a controlled amount of additional air in the exhaust stream, and then seeks to oxidize CO and hydrocarbons, either catalytically or thermally (the latter either with or without a true flame) by addition of the oxygen in the added air. Again, NO can be increased by this approach.

Marked reduction in the NO content of exhaust gas can be achieved with supported catalyst comprising ruthenium and iridium, as described in my copending application Ser. No. 770,080, filed Oct. 23, 1968 now U.S. Pat. No. 3,637,344. This catalyst performs best at low oxygen concentrations. It is therefore possible, in fact, preferable, to use rich mixtures which are best from the standpoint of engine operating efficiency. The supports described therein are porous particulate materials, such as alumina, and the like. The catalysts therein are easily prepared by impregnation of the support with aqueous solutions of ruthenium and iridium salts, followed by calcination. However, porous particulate supports give high pressure drops and are subject to some attrition at the high space velocities prevailing in automotive exhaust gas steams. Furthermore, warmup times of such catalysts are slow because of their large mass and large heat capacity. Hence, the art has been seeking a catalyst having the high efficiency for removing nitrogen oxides which is characteristic of the invention of my copending application, and at the same time being rugged, giving low pressure drop even at high space velocities, and having fast warmup time.

SUMMARY OF THE INVENTION

According to this invention, there is provided a novel catalyst comprising a mixture of ruthenium and iridium on a conductive support. The ruthenium and iridium are in the form of the free metals, metal oxides, or mixtures thereof, and the weight percentage of iridium, based on the combined weights of ruthenium and iridium, is in the range of about 10 to about 60 percent.

The catalyst can be prepared by electrodepositing a thin layer of ruthenium followed by a thin layer of iridium on the surface of the support, heating the support having ruthenium and iridium thereon in the presence of oxygen to form the oxides of ruthenium and iridium, and reducing the ruthenium and iridium oxides to the free metals. Reduction of the metal oxides results in the diffusion of the ruthenium and iridium into each other to form a mixed metal layer. A catalyst having such a mixed metal layer is much more active than the article as plated, in which the ruthenium and iridium are in separate and distinct layers. This catalyst efficiently removes nitrogen oxides from exhaust gas streams containing less than about 2 percent oxygen, and performs most efficiently when the gas stream contains less than about 1 percent, preferably less than about ½ percent oxygen by volume.

DESCRIPTION OF THE PREFERRED EMBODIMENT

The present invention makes it possible to use supports having relatively low surface area and poor wetting characteristics, and particularly metallic supports, which cannot be successfully impregnated with ruthenium and iridium solutions according to the teachings of my earlier application, now U.S. Pat. No. 3,637,344. The metallic supports of this invention have the advantages of being lighter and of having lower heat capacity, which together mean that the present catalyst will warm up much faster in an automobile engine than will the impregnated catalyst of my earlier copending application. Furthermore, the supports herein provide a very rugged catalyst which is not subject to attrition.

The support according to the present invention is preferably a ferrous metal, such as chromium steel, stainless steel, or other metal or alloy which is not subject to severe oxidation in an exhaust gas stream. Among the metals and alloys which may be advantageously used are SS 304 and 316, and chromium steel 410 and 420. Nonferrous metal supports can be used provided they have a high enough melting point to withstand the heat of an automobile exhaust manifold.

Temperatures as high as about 1700°F. may be encountered in the exhaust manifold during normal operation of an automobile, and the support should be able to withstand this temperature. Nonferrous metals which have a sufficiently high melting point are generally uneconomical. The metal may be in any desired form, as for example crimped metal sheets or strips, other fabricated sheet metal shapes, wire screens, or other desired form. Alternatively, the support can be a metal coated ceramic, the metal outer layer coating being provided so as to provide the conductive surface for electroplating ruthenium an iridium thereon, but such support offers no functional advantages over the all metal support and is generally more expensive to fabricate.

A layer of ruthenium and iridium, either in the form of the free metals, the oxides, or a mixture of metals and oxides, is formed on the outer surface of the support. It is this layer which is primarily responsible for the catalytic activity of the catalyst. This layer is ordinarily about 0.3 to about 5 microinches thick. The amount of iridium in this layer is ordinarily about 10 to about 60 percent by weight of iridium (as the metal), based on the combined weights of ruthenium and iridium. The balance of this outer layer is substantially ruthenium.

The weight ratios of ruthenium and iridium to total catalyst weight, including support, may be varied over wide limits. The support usually constitutes the major portion of the total catalyst weight, but the percentage of total weight accounted for by the support is not critical. Generally the combined weights of ruthenium and iridium will constitute about 0.03 to about 0.5 percent of the total weight of the catalyst.

Ferrous metal supports are cleaned and plated with nickel prior to electrodeposition of ruthenium and iridium. First the support is cleaned by conventional methods, e.g., with a degreasing solvent such as acetone followed by an acid cleaning bath, e.g., aqueous hydrochloric acid. The support is then prepared by cathodic and then anodic treatment. It is then desirable to electroplate a thin layer of nickel on the ferrous metal, since electrodeposited ruthenium adheres readily to nickel but not to most ferrous metal and alloy surfaces.

Ruthenium is then electrodeposited from a suitable plating bath, such as aqueous solution of ruthenium nitrosyl chloride. Suitable baths, current densities, and operating temperatures are described in Belgian Pat. No. 722,559. Desirable thicknesses of the ruthenium electroplate range from about 0.2 to about 3 microinches.

Iridium is then deposited on the composite. Iridium may be electrodeposited from a plating bath of iridium bromide or other desired salt of iridium. Suitable plating baths and conditions are described in an article by C. J. Tyrrell, "The Electrodeposition of Iridium," *Transactions of the Institute of Metal Finishing*, 43, 161 (1965). The nickel is electroplated to a depth of about 0.1 to about 2 microinches, the depths of the ruthenium and iridium layers being coordinated so that iridium constitutes about 10 to about 60 percent of the combined weight of ruthenium and iridium as previously indicated. Since iridium has a density about 1.83 times that of ruthenium, the thickness of the iridium plate may vary from about 0.06 to about 0.82 times that of the ruthenium plate.

After the ruthenium and iridium have been electrodeposited, the composite is then heated in an oxidizing atmosphere at a temperature of about 1200° to about 1600°F. for about 1 to about 4 hours. This causes the ruthenium and the iridium to be oxidized to their respective oxides. It is not essential that all of the ruthenium and iridium be oxidized. The heating time depends on the thickness of the electroplated layers and on the temperature, the longer heating times being associated with lower temperatures and thicker plates. Ordinarily, the higher temperatures within the specified range are used in heating the thicker plated layers.

The catalyst in the oxide form is then heated in a gaseous reducing atmosphere to convert the oxides of ruthenium and iridium back to the free metals. Any desired gaseous reducing agent, such as carbon monoxide or hydrogen, can be used. Reduction is carried out at elevated temperatures, e.g., in the range of about 700° to about 1000°F. when carbon monoxide is the reducing agent. Hydrogen can be used at lower temperatures, down to about 400°F. The free metals diffuse into each other, forming a catalytically active layer comprising a mixture of ruthenium and iridium. The catalyst is ready for use after this reduction treatment. This reduction appears necessary in order to activate the catalyst. Catalysts of this invention are quite active after the oxidation and reduction treatment, while the article immediately after electroplating of ruthenium and iridium has little or no catalytic activity.

The catalyst in the oxide form can be put into service in an automobile, provided the automobile is used in urban or other stop-and-go driving until the ruthenium and iridium oxides are reduced to the free metals. The atmosphere in an automobile exhaust manifold is reducing during idling and deceleration, and such operation will reduce the metal oxides and activate the catalyst. Turnpike driving will not activate the catalyst, since the prevailing atmosphere in the exhaust manifold during high speed cruise is oxidizing. It is preferable to carry out both the oxidation and reduction treatments prior to installation of the catalyst in an automobile.

The catalysts of this invention are effective under conditions normally encountered in an automobile exhaust manifold, i.e., temperatures up to about 1700°F., and pressures from about near atmospheric to about 10 psig. These catalysts are effective even at extremely high space velocities, up to about 400,000 (STP) volumes of gas per volume of catalyst per hour; hence, only small catalyst volumes are needed.

The exhaust gas stream preferably contains no more than about 2 percent of oxygen by volume, and ordinarily no more than about 1 percent by volume. Best results are obtained when the percentage of oxygen in the gas stream is about 0.5 percent by volume or less. Under these conditions, nearly complete removal of nitrogen oxides is obtainable. As the percentage of oxygen in the exhaust gas goes up above 0.5 percent, the percentage conversion of NO drops. Removal of NO is frequently substantially less than complete when the oxygen percentage is between 1 and 2 percent, therefore such oxygen percentages are preferably avoided.

This means that the engine is operated under rich conditions, which as explained previously is preferred for maximum power output, although present-day automobiles have frequently tended towards somewhat leaner gas-air mixtures in order to minimize carbon monoxide and hydrocarbon emissions.

The catalyst of the present invention can be used as part of a catalyst system which also includes an oxidation catalyst, in order to obtain substantial reduction of carbon monoxide and hydrocarbons as well as nitric oxide. Such catalyst system may comprise, for example, the catalyst of the present invention as the first catalyst, followed by a secondary air inlet and a second catalyst bed containing an oxidation catalyst. Passage of the exhaust gas over the ruthenium and iridium catalyst of this invention results in substantial removal of nitrogen oxides from the exhaust gases. Then controlled amounts of secondary air can be admitted, and the contents of CO and unburned hydrocarbons in the exhaust gas substantially reduced by passage through the oxidation catalyst, without substantial formation of nitrogen oxides. The result is an exhaust gas having substantially reduced quantities of all major pollutants. Suitable secondary air admission devices and oxidation catalysts and their operation are known in the art, and the details thereof do not form a part of the present invention.

This invention will now be further described with reference to specific embodiments thereof, as illustrated in the following examples.

EXAMPLE 1

Preparation and Laboratory Testing of Catalyst

A 40 mesh type 304 stainless steel screen having 41 wires per inch was degreased in acetone, dipped in a 1:1 aqueous hydrochloric acid solution for one minute, rinsed in water, cleaned cathodically for 30 to 60 seconds at about 0.1 ampere per square centimeter at 140°F. in a solution containing 60 grams per liter of sodium carbonate. Nickel was then electrodeposited thereon in an acid nickel chloride strike bath containing 240 grams per liter of $NiCl_2 \cdot 6H_2O$ and 38 grams per liter of HCl. The screen was made the anode for 30 seconds, followed by two minutes of cathodic plating, at current densities of about 0.05 to 0.1 amperes per square centimeter.

The support was then placed in a plating bath containing ruthenium nitrosyl chloride, having a concentration of 12 g./l. of Ru and a pH of 1.7. The area of the screen was 5 square centimeters. The screen was electroplated at a current density of 10 ma/cm.$^2$, and at a temperature of 158°F. until a thickness of 1.0 microinch of bright ruthenium was obtained. The composite was then electroplated with iridium, using a plating bath containing iridium bromide having a concentration of 5 g./l. of iridium, at a current density of 3 ma./cm.$^2$ and a temperature of 122°F., until an iridium electrodeposit having a thickness of 0.6 microinch was obtained. The composite was then placed in a furnace and heated in air at about 1400°F. for about 2 hours. This resulted in oxidation of the ruthenium and iridium to the oxides and the intermingling of the ruthenium and iridium layers to form a single layer containing both metals. The composite catalyst was then placed in an exhaust gas stream supplied with the exhaust gases from a stationary laboratory gasoline burner. The catalyst was heated in this exhaust gas stream for 2 hours at 900°F. The specimen tested had an electroplate of 1.0 microinch of ruthenium and 0.6 microinch of iridium, which is equivalent to 52 weight percent of iridium, based on the combined weights of ruthenium and iridium. (The density of the iridium electroplate is about 1.83 times the density of the ruthenium electroplate.) The specimen was tested at a space velocity of 100,000 v./v./hr., and at 900° and 1100°F. Varying percentages of oxygen in the exhaust gas were obtained by appropriate control of the richness of the gas-air mixture fed to the burner. Results are given in Table I below.

TABLE I

| Temperature, °F. | % NO Removed at $O_2$ % by Volume Shown | | |
|---|---|---|---|
| | 0 | 0.5 | 0.8 |
| 900 | 96 | 100 | 87 |
| 1100 | 100 | 100 | 67 |
| 900 | 100 | 100 | 100 |
| 1100 | 100 | 100 | 100 |
| 900 | 99 | 100 | 100 |
| 1100 | 100 | 100 | 100 |

EXAMPLE 2

A ruthenium-iridium catalyst on a stainless steel screen was formed according to the procedure of Example 1. The catalyst was activated by heating in air for two hours at 1400°F. This catalyst was then evaluated in an automobile exhaust gas manifold, using the hot cycle test procedures (i.e., cycles 6 and 7) of the standard California cycle as reported in California Motor Vehicle Pollution Control Board, "California Test Procedure and Criteria for Motor Vehicle Exhaust Emission Control," revised Jan. 18, 1967. The catalyst was then tested under steady cruise conditions at 50 miles per hour. This cruise speed was maintained until all analyses were constant. Results are shown in Table II below. All operations of this example are simulated operations using a dynamometer.

TABLE II

Hot California Cycle Evaluation

| | ppm NO |
|---|---|
| Without Catalyst | 1152 |
| With Catalyst | |
| 0 miles | 255 |
| 521 miles | 127 |
| 2549 miles | 123 |
| 5073 miles | 182 |

50 MPH Cruise at 20 Road HP

| | ppm NO |
|---|---|
| Without Catalyst | 1771 |
| With Catalyst | |
| 0 miles | 242 |
| 521 miles | 173 |
| 5073 miles | 227 |

The parts per million of NO in Table II above are average values obtained over the entire cycles of operation. Thus, in operating according to the California cycle, the concentrations of unburned hydrocarbons and of carbon monoxide in the exhaust gas are highest, and the concentration of NO correspondingly lowest, during deceleration. Conversely, the NO concentration was greatest and the hydrocarbon and carbon monoxide concentrations lowest during acceleration. The overall percentage of nitrogen oxide was higher during cruise than during the California cycle testing, since the gas-air mixture supplied to the engine is leaner during high speed cruising than during the California cycle, which is predominantly at lower speeds. As can be seen, marked reductions in NO concentration were achieved in both evaluations.

What is claimed is:

1. A method of purifying exhaust gases from internal combustion engines by catalytically converting unburned hydrocarbons, carbon monoxide and nitrogen oxides present therein, which comprises contacting said exhaust gases at a temperature above about 500°F. with a catalyst comprising a mixture of ruthenium and iridium on a metallic support, said ruthenium and said iridium being in the form of the free metal, a metal oxide, or a mixture thereof, the weight percentage of iridium, based on the combined weights of ruthenium and iridium, being in the range of about 10 percent to about 60 percent.

2. A method according to claim 1 in which no secondary air is added to said exhaust gas.

3. A method according to claim 1 in which said support comprises a ferrous metal core having a thin layer of nickel deposited thereon.

4. A method according to claim 1 in which said mixture of ruthenium and iridium is in the form of a thin layer on the surface of said support.

5. A method according to claim 1 in which said exhaust gases contain no more than about 2% of oxygen by volume.

6. A method according to claim 1 in which said exhaust gases contain no more than about 1% of oxygen by volume.

* * * * *